US006809283B2

(12) United States Patent
Kowdley et al.

(10) Patent No.: US 6,809,283 B2
(45) Date of Patent: Oct. 26, 2004

(54) NOBLE METAL IN-SITU SAMPLING METHOD AND APPARATUS

(75) Inventors: Balasubramanian Srikantiah Kowdley, San Jose, CA (US); Frank Ortega, San Jose, CA (US); James Edward Kasik, San Jose, CA (US); Terry Lynn Chapman, Los Gatos, CA (US)

(73) Assignee: General Electric Company, Schenectady, NY (US)

( * ) Notice: Subject to any disclaimer, the term of this patent is extended or adjusted under 35 U.S.C. 154(b) by 72 days.

(21) Appl. No.: 10/064,803

(22) Filed: Aug. 19, 2002

(65) Prior Publication Data

US 2004/0035835 A1 Feb. 26, 2004

(51) Int. Cl.[7] .............................. B23H 1/00; B23H 9/00
(52) U.S. Cl. ................................ 219/69.11; 219/69.17; 219/69.2; 376/260
(58) Field of Search ........................... 219/69.14, 69.15, 219/69.17, 69.2; 376/260

(56) References Cited

U.S. PATENT DOCUMENTS

| 3,390,247 A | * | 6/1968 | Webb |
| 4,071,729 A | * | 1/1978 | Bell, Jr. |
| 4,672,162 A | * | 6/1987 | Burns et al. |
| 4,948,933 A |   | 8/1990 | Thompson |
| 5,089,681 A |   | 2/1992 | El-Menshawy |
| 5,225,645 A |   | 7/1993 | Overbay et al. |
| 5,268,550 A | * | 12/1993 | Blocquel ................. 219/69.17 |
| 5,317,607 A |   | 5/1994 | Formanek |
| 5,408,883 A | * | 4/1995 | Clark, Jr. et al. |
| 5,543,599 A |   | 8/1996 | Cole et al. |
| 5,687,205 A |   | 11/1997 | Matsumoto et al. |
| 5,802,126 A |   | 9/1998 | Matsumoto et al. |
| 5,897,793 A |   | 4/1999 | Chavez |
| 6,197,188 B1 | * | 3/2001 | Lamoureux |
| 6,233,301 B1 |   | 5/2001 | Robergeau |
| 6,309,147 B1 |   | 10/2001 | Matsumoto et al. |

FOREIGN PATENT DOCUMENTS

JP          2001-219317 A    *  8/2001

* cited by examiner

*Primary Examiner*—Geoffrey S. Evans
(74) *Attorney, Agent, or Firm*—Armstrong Teasdale LLP

(57) ABSTRACT

An electric discharge machining sampling apparatus for obtaining samples from a surface of metal components provided. In an exemplary embodiment, the sampling apparatus is operable underwater and includes a base plate and an electrode assembly movably coupled to the base plate. The electrode assembly includes an electric discharge electrode and an electrode holder with the electrode including at least one bore extending therethrough. The sampling apparatus also includes a particle collection assembly operatively coupled to the electrode. Each electrode bore is in flow communication with the particle collection assembly.

19 Claims, 3 Drawing Sheets

NOBLE METAL IN-SITU SAMPLING METHOD AND APPARATUS

BACKGROUND OF INVENTION

This invention relates generally to inspection of nuclear reactors, and more particularly to an electric discharge machining (EDM) apparatus for obtaining a material sample within a nuclear reactor pressure vessel.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

Internal structures of operating BWRs are susceptible to various corrosive and cracking processes. Stress corrosion cracking (SCC) is one known phenomenon occurring in reactor components, such as structural members, piping, fasteners, and welds, exposed to high temperature water. The reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to SCC.

Surface treatments such as Noble Metal Chemical Addition (NMCA) are used to produce an adherent, micro-layer coating or film on the surface of nuclear reactor components. During application, the NMCA treatment may not be uniformly deposited, and during service, the treatment may be removed from the surface due to corrosion or other mechanisms. To measure the NMCA distribution or concentration on the surface, a sample of the material surface oxide is needed. A sample of sufficient surface area and mass needs to be obtained with minimal damage to the reactor component.

One method used to obtain a sample of the material surface oxide involves the use of a small grinding wheel or stone and an associated vacuum to collect the grindings or residue. This method typically does not provide a suitable sample size for the necessary measurements. Another method to obtain a sample of the material surface oxide involves the use of a machining burr or similar tool to remove chips of the surface metal that contain the surface oxide. This method causes a large surface indentation, and may also destroy or disperse the oxide of interest before the metal chips can be removed. Still another method of obtaining a sample of the material surface oxide involves removing a large sample of material from the reactor component by machining or a similar process. The removal of a large sample significantly alters the surface of the reactor component and may require repair, special analysis of the reactor component, or future in-service monitoring of the reactor component.

SUMMARY OF INVENTION

In one aspect, an electric discharge machining sampling apparatus for obtaining samples from a surface of metal components is provided. The sampling apparatus is operable underwater and includes a base plate and an electrode assembly movably coupled to the base plate. The electrode assembly includes an electric discharge electrode and an electrode holder with the electrode including at least one bore extending therethrough. The sampling apparatus also includes a particle collection assembly operatively coupled to the electrode. Each electrode bore is in flow communication with the particle collection assembly.

In another aspect, an electric discharge machining sampling apparatus for obtaining samples from a surface of components in a nuclear reactor is provided. The sampling apparatus is operable underwater and includes a base plate and an electrode assembly movably coupled to the base plate. The electrode assembly includes an electric discharge electrode and an electrode holder with the electrode including at least one bore extending therethrough. The sampling apparatus also includes a particle collection assembly operatively coupled to the electrode. Each electrode bore is in flow communication with the particle collection assembly. The particle collection assembly includes a filter media positioned in a filter housing with the filter housing operatively coupled to a vacuum source.

In another aspect, a method of performing in-situ sampling of metal surfaces of components in a nuclear reactor is provided. The method includes positioning an electric discharge machining sampling apparatus adjacent a metal surface of a reactor component in the reactor, activating the sampling apparatus to produce a debris of particles from the surface of the reactor component, and collecting the particle debris. The sampling apparatus is operable underwater and includes a base plate and an electrode assembly movably coupled to the base plate. The electrode assembly includes an electric discharge electrode and an electrode holder with the electrode including at least one bore extending therethrough. The sampling apparatus also includes a particle collection assembly operatively coupled to the electrode. Each electrode bore is in flow communication with the particle collection assembly.

DETAILED DESCRIPTION

An electric discharge machining (EDM) sampling apparatus that is operable underwater and that is capable of obtaining material samples from components of a boiling water nuclear reactor is described below in more detail. The EDM sampling apparatus is easily positioned in the reactor and is capable of maintaining position in the reactor to complete the process of material extraction from a reactor component with minimal or negligible damage to the surface of the reactor component. The sample material is removed, including the NMCA film and any surface oxide, from a predetermined surface area of the component and can be removed from the reactor for transport to a laboratory or test system for analysis.

The EDM sampling apparatus is described below in relation to obtaining samples from nuclear reactor components. However, the EDM sampling apparatus can be used to obtain metal samples of components in a variety of applications. For example, the EDM sampling apparatus can be used to examine the surface oxide condition of tanks or pipes, or to examine the oxide buildup on high temperature gas turbine or jet engine components. The EDM sampling apparatus can also be used in laboratory analysis where a metal sample must have an oxide layer removed from the surface to properly examine the bare base metal.

Figure 1:
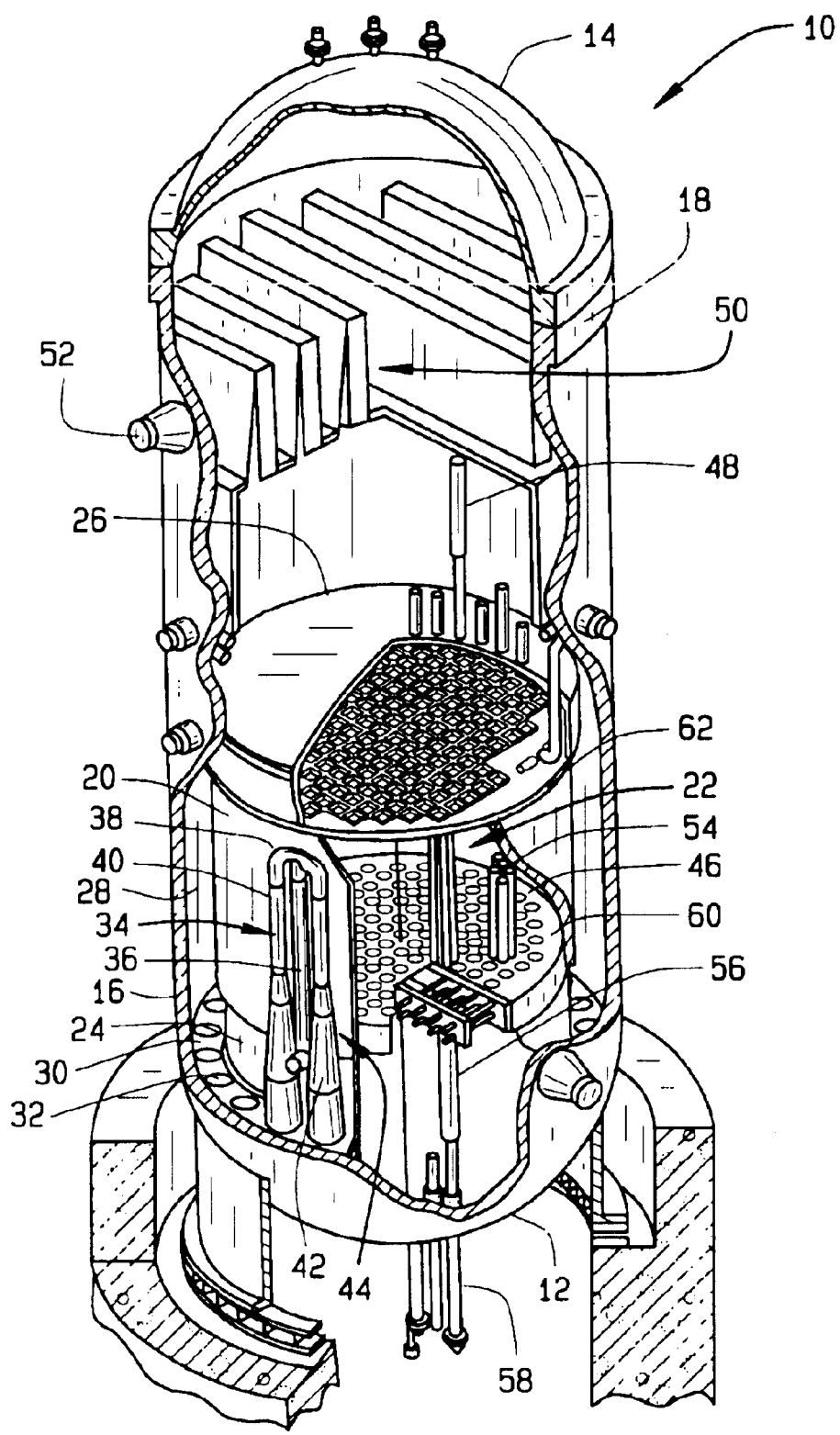
FIG. 1 is a sectional view, with parts cut away, of a boiling water nuclear reactor pressure vessel.

Referring now to the figures, FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. Side wall 16 includes a top flange 18. Top head 14 is attached to top flange 18. A cylindrically shaped core shroud 20 surrounds a reactor core 22. Shroud 20 is supported at one end by a shroud support 24 and includes a removable shroud head 26 at the other end. An annulus 28 is formed between shroud 20 and side wall 16. A pump deck 30, which has a ring shape, extends between shroud support 24 and RPV side wall 16. Pump deck 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 includes an inlet mixer 40, and a diffuser 42. Inlet riser 36 and two connected jet pumps 34 form a jet pump assembly 44.

Heat is generated within core 22, which includes fuel bundles 46 of fissionable material. Water circulated up through core 22 is at least partially converted to steam. Steam separators 48 separates steam from water, which is recirculated. Residual water is removed from the steam by steam dryers 50. The steam exits RPV 10 through a steam outlet 52 near vessel top head 14.

The amount of heat generated in core 22 is regulated by inserting and withdrawing control rods 54 of neutron absorbing material, such as for example, boron carbide. To the extent that control rod 54 is inserted into fuel bundle 46, it absorbs neutrons that would otherwise be available to promote the chain reaction which generates heat in core 22. Control rod guide tubes 56 maintain the vertical motion of control rods 54 during insertion and withdrawal. Control rod drives 58 effect the insertion and withdrawal of control rods 54. Control rod drives 58 extend through bottom head 12.

Fuel bundles 46 are aligned by a core plate 60 located at the base of core 22. A top guide 62 aligns fuel bundles 46 as they are lowered into core 22. Core plate 60 and top guide 62 are supported by core shroud 20.

Figure 2:
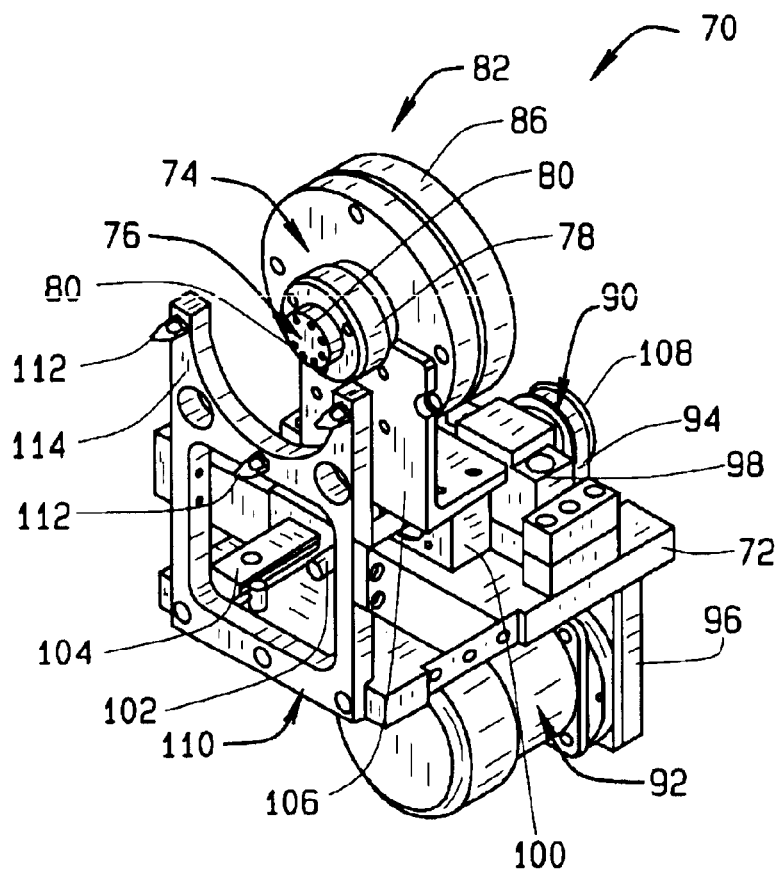
FIG. 2 is a perspective view of a sampling apparatus in accordance with an embodiment of the present invention.

FIG. 2 is a perspective view of an EDM sampling apparatus 70 in accordance with an exemplary embodiment of the present invention. Sampling apparatus 70 includes a base plate 72 and an electrode assembly 74 movably coupled to base plate 72. Electrode assembly 74 includes an electric discharge electrode 76 and an electrode holder 78. Bores 80 extend through electrode 76. Electrode 76 can be formed from any suitable material, for example, graphite or a silver tungsten material.

Sampling apparatus 70 also includes a particle collection assembly 82 operatively coupled to electrode 76 with each electrode bore 80 in flow communication with particle collection assembly 82. Collection assembly 82 includes a filter element 84 (shown in FIG. 4) located inside a filter housing 86. Collection assembly 82 is operatively connected to a water vacuum pump (not shown) to draw water containing the fine particles or "swarf" produced from the EDM process through electrode bores 80 and into filter housing 86. Inside housing 86, the swarf is collected on filter element 84 as the water passes through filter housing 86. In an alternate embodiment, electrode holder 78 includes bores that are in flow communication with filter housing to provide for the collection of the swarf in collection assembly 82.

A drive mechanism 90 is coupled to base plate 72 and is operatively coupled to a motor 92 by a drive belt 94. Motor 92 is coupled to base plate 72 by mounting bracket 96. Drive mechanism 90 includes a support block 98 coupled to base plate 72, trolley 100 operatively coupled to a lead screw 102 and linear slide 104. An L-shaped mounting bracket 106 is coupled to trolley 100 and is attached to filter housing 86 and electrode holder 78. A drive pulley 108 is operatively coupled to lead screw 102 and is sized to receive drive belt 94.

An alignment bracket 110 is coupled to base plate 72. Adjustable leveling studs 112 extend from a first surface 114 of alignment bracket 110. Leveling studs 112 are adjusted prior to installation of apparatus 70 in reactor 10 to accommodate for the curvature of the reactor component being examined.

Figure 4:
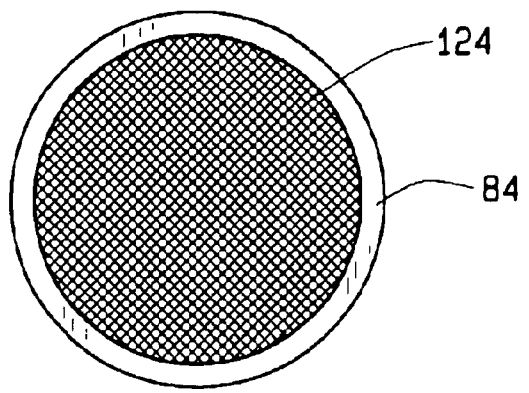
FIG. 4 is a top view of a filter element of the sampling apparatus shown in FIG. 2.
Figure 3:
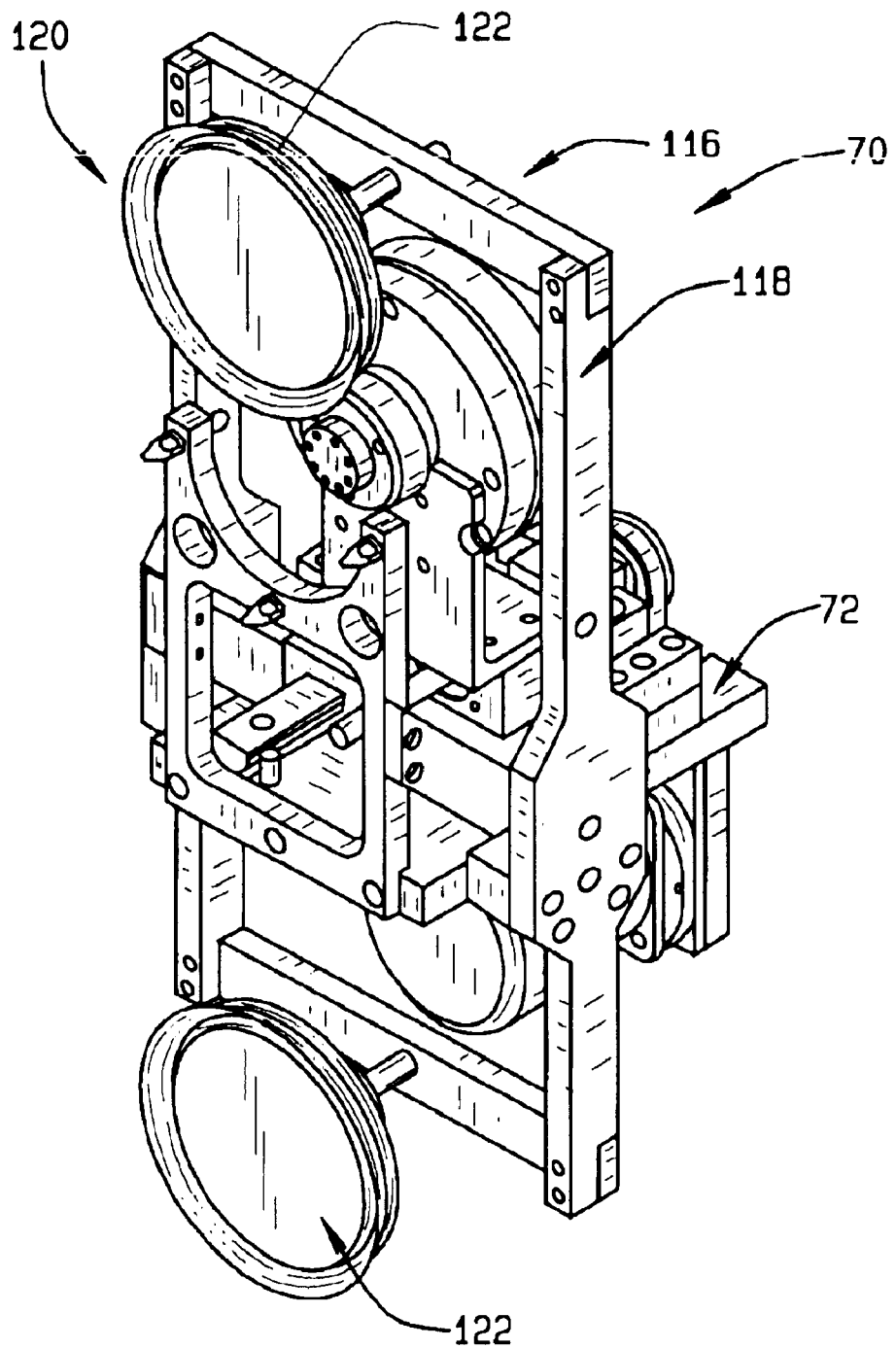
FIG. 3 is a perspective view of the sampling apparatus shown in FIG. 2 coupled to a delivery tool.

Referring to FIG. 3, EDM sampling apparatus 70 also includes a positioning assembly 116 that includes a support bracket 118 and a means 120 for coupling apparatus 70 to a reactor component. In the exemplary embodiment, means 120 for coupling apparatus 70 to a reactor component includes suction cups 122 coupled to support bracket 118. In other embodiments, suitable means 120 for coupling apparatus 70 to a reactor component includes, but are not limited to, a clamp assembly, a wedge assembly, a hook assembly, fastener assemblies, and combinations thereof. Also, FIG. 4 shows filter element 84 with collected swarf 124.

To obtain a test sample from a surface of a component of reactor 10, sampling apparatus 70 is positioned in reactor 10, underwater, with electrode 76 adjacent the surface of the reactor component to be examined. Suction cups 122 secure sampling apparatus 70 to the surface of the reactor component with adjustable leveling studs 112 contact the surface of the reactor component to align electrode 76 with the surface of the reactor component. Motor 92 is actuated to move trolley 100 along linear slide 104 to position electrode 76 at the desired distance from the surface from the reactor component. EDM electrode 76 is activated to create an electric discharge to vaporize the surface of the reactor component and produce fine particle debris or swarf. Water and the swarf is directed through bores 80 in electrode by the action of the water vacuum pump (not shown) and is collected on filter element 84 inside filter housing 86. Apparatus 70 is then shut down and removed from reactor 10. Filter element 84 is removed from filter housing 86 and is transported to a laboratory or test system (not shown) for analysis to determine the amount or concentration of noble metal deposited on the surface of the examined reactor component.

Sampling apparatus 70 obtains samples from reactor components for determining noble metal concentrations that produce only shallow (about 0.001 to about 0.004 inches in depth) sample areas on the reactor component. The shallow sample area has minimal or negligible effect on the reactor component surface. The depth of the sample area is controlled by the EDM parameters, for example the electrode material, current and voltage supplied to the electrode, and discharge time. Also, the supplied current and voltage can be constant or pulsating with variable amplitude, pulse frequency and pulse duration.

While the invention has been described in terms of various specific embodiments, those skilled in the art will recognize that the invention can be practiced with modification within the spirit and scope of the claims.

What is claimed is:

1. An electric discharge machining sampling apparatus for obtaining samples from a surface of metal components, said apparatus operable underwater and comprising:
   a base plate;
   an electrode assembly movably coupled to said base plate, said electrode assembly comprising an electric discharge electrode and an electrode holder, said electrode comprising at least one bore extending therethrough;
   a particle collection assembly operatively coupled to said electrode, said at least one electrode bore in flow communication with said particle collection assembly; and
   a positioning assembly coupled to said base plate, said positioning assembly comprising a support bracket coupled to said base plate and a means for coupling said sampling apparatus to a component.

2. An apparatus in accordance with claim 1 further comprising a motor and an electrode drive mechanism operatively coupled to said motor and said electrode assembly.

3. An apparatus in accordance with claim 2 wherein said electrode drive mechanism is configured to move said electrode assembly along a plane substantially perpendicular to the surface of a component.

4. An apparatus in accordance with claim 1 further comprising an alignment bracket coupled to said base plate.

5. An apparatus in accordance wvith claim 4 wherein said alignment bracket comprises at least three leveling studs.

6. An apparatus in accordance with claim 1 wherein said means for coupling said sampling apparatus to a component comprises at least two suction cups coupled to said support bracket.

7. An apparatus in accordance with claim 1 wherein said particle collection assembly comprises a filter element positioned in a filter housing, said filter housing operatively coupled to a vacuum source.

8. An electric discharge machining sampling apparatus for obtaining samples from a surface of components in a nuclear reactor, said apparatus operable underwater and comprising:
   a base plate;
   an electrode assembly movably coupled to said base plate, said electrode assembly comprising an electric discharge electrode and an electrode holder, said electrode comprising at least one bore extending therethrough;
   an alignment bracket coupled to said base plate, said alignment bracket comprising at least three leveling studs; and
   a particle collection assembly operatively coupled to said electrode, said at least one electrode bore in flow communication with said particle collection assembly, said particle collection assembly comprising a filter element positioned in a filter housing, said filter housing operatively coupled to a vacuum source.

9. An apparatus in accordance with claim 8 further comprising a motor and an electrode drive mechanism operatively coupled to said motor and said electrode assembly, said electrode drive mechanism configured to move said electrode assembly along a plane substantially perpendicular to the surface of a reactor component.

10. An apparatus in accordance with claim 8 further comprising a positioning assembly coupled to said base plate.

11. An apparatus in accordance with claim 10 wherein said positioning assembly comprises a support bracket coupled to said base plate and a means for coupling said sampling apparatus to a reactor component.

12. An apparatus in accordance with claim 11 wherein said means for coupling said sampling apparatus to a reactor component comprises at least two suction cups coupled to said support bracket.

13. A method of performing in-situ sampling of metal surfaces of components in a nuclear reactor, said method comprising:
   positioning an electric discharge machining sampling apparatus adjacent a metal surface of a reactor component in the reactor;
   activating the sampling apparatus to produce a debris of particles from the surface of the reactor component; and
   collecting the particle debris, the electric discharge machining sampling apparatus comprising:
   a base plate;
   an electrode assembly movably coupled to the base plate, the electrode assembly comprising an electric discharge electrode and an electrode holder, the electrode comprising at least one bore extending therethrough; and
   a particle collection assembly operatively coupled to the electrode, the at least one electrode bore in flow communication with the particle collection assembly, wherein the sampling apparatus further comprises a positioning assembly coupled to the base plate, the positioning assembly comprising a support bracket coupled to the base plate and a means for coupling the sampling apparatus to a reactor component, said positioning an electric discharge machining sampling apparatus adjacent a metal surface of a reactor component in the reactor comprises locating the sampling apparatus adjacent the reactor component and coupling the sampling apparatus to the reactor component.

14. A method in accordance with claim 13 wherein the sampling apparatus further comprises a motor and an electrode drive mechanism operatively coupled to the motor and the electrode assembly, the electrode drive mechanism configured to move the electrode assembly along a plane substantially perpendicular to the surface of a reactor component, and positioning an electric discharge machining sampling apparatus adjacent a metal surface of a reactor component in the reactor comprises activating the electrode drive mechanism to position the electrode a predetermined distance from the surface of the reactor component.

15. A method in accordance with claim 13 wherein the sampling apparatus further comprises an alignment bracket coupled to the base plate, the alignment bracket comprises at least three leveling studs, and positioning an electric discharge machining sampling apparatus adjacent a metal surface of a reactor component in the reactor comprises coupling the sampling apparatus to the reactor component so that the at least three leveling studs engage the surface of the reactor component.

16. A method in accordance with claim 13 wherein the sampling apparatus further comprises a filter element positioned in a filter housing, the filter housing operatively coupled to a vacuum source, and collecting the particle debris comprises directing the particle debris through the electrode bores and into the filter housing and onto the filter element.

17. A method in accordance with claim 16 wherein directing the particle debris through the electrode bores comprises applying a vacuum to the particle collection assembly to flow water and particle debris through the at least one electrode bore and into the filter housing and onto the filter element.

18. A method in accordance with claim 13 further comprising controlling the amount of metal removed from the surface of the reactor component by controlling current and voltage inputs to the electric discharge machining apparatus.

19. A method in accordance with claim 18 wherein controlling current and voltage inputs comprises pulsing the current and voltage inputs with variable amplitude, pulse frequency, and pulse duration.

* * * * *

UNITED STATES PATENT AND TRADEMARK OFFICE
CERTIFICATE OF CORRECTION

PATENT NO. : 6,809,283 B2
DATED : October 26, 2004
INVENTOR(S) : Kowdley et al.

It is certified that error appears in the above-identified patent and that said Letters Patent is hereby corrected as shown below:

Column 5,
Line 32, delete "wvith" and insert -- with --.

Signed and Sealed this

Twenty-third Day of May, 2006

JON W. DUDAS
*Director of the United States Patent and Trademark Office*